US012654447B2

(12) United States Patent
Goto et al.

(10) Patent No.: US 12,654,447 B2
(45) Date of Patent: Jun. 16, 2026

(54) LIQUID DISPENSING HEAD AND LIQUID DISPENSING DEVICE

(71) Applicant: RISO Technologies Corporation, Tokyo (JP)

(72) Inventors: Taiki Goto, Izunokuni (JP); Shinichiro Hida, Numazu (JP); Masashi Shimosato, Mishima (JP)

(73) Assignee: RISO Technologies Corporation, Tokyo (JP)

( * ) Notice: Subject to any disclaimer, the term of this patent is extended or adjusted under 35 U.S.C. 154(b) by 195 days.

(21) Appl. No.: 18/444,189

(22) Filed: Feb. 16, 2024

(65) Prior Publication Data

US 2024/0424786 A1 Dec. 26, 2024

(30) Foreign Application Priority Data

Jun. 20, 2023 (JP) ................................ 2023-100864

(51) Int. Cl.
*B41J 2/14* (2006.01)

(52) U.S. Cl.
CPC ....... *B41J 2/14274* (2013.01); *B41J 2/14201* (2013.01); *B41J 2/14233* (2013.01); *B41J 2002/14491* (2013.01)

(58) Field of Classification Search
CPC ................ B41J 2/14274; B41J 2/14201; B41J 2/14233; B41J 2002/14491
See application file for complete search history.

(56) References Cited

U.S. PATENT DOCUMENTS 6,338,549 B1 * 1/2002 Kitahara ................ B41J 2/1612 347/68
2012/0092422 A1 * 4/2012 Murochi ................ B41J 2/1629 29/890.1

FOREIGN PATENT DOCUMENTS

JP 2011056730 A 3/2011

* cited by examiner

*Primary Examiner* — Geoffrey S Mruk
(74) *Attorney, Agent, or Firm* — Kim & Stewart LLP

(57) ABSTRACT

According to an embodiment, a liquid dispensing head includes a substrate having a first surface and a piezoelectric member on the first surface of the substrate. A sidewall surface portion of the piezoelectric member is inclined at an obtuse angle with respect to the first surface. A vibration plate is positioned above the piezoelectric member in a first direction orthogonal to the first surface. An electrode wiring portion is on the sidewall surface portion and connected to an electrode wiring pattern on the first surface.

20 Claims, 5 Drawing Sheets

LIQUID DISPENSING HEAD AND LIQUID DISPENSING DEVICE

CROSS-REFERENCE TO RELATED APPLICATION

This application is based upon and claims the benefit of priority from Japanese Patent Application No. 2023-100864, filed on Jun. 20, 2023, the entire contents of which are incorporated herein by reference.

FIELD

Embodiments described herein relate to a liquid dispensing head and a liquid dispensing device.

BACKGROUND

A piezoelectric actuator using a piezoelectric material, such as lead zirconate titanium (PZT), is used as a drive source of a liquid dispensing device such as an ink jet printer head. In the ink jet printer head or the like, actuators are disposed at very fine intervals, and there is a structure in which a large number of grooves are formed in one piezoelectric body. In such a structure, the sidewall portions of the grooves form an actuator. In order to drive an actuator, each sidewall portion is provided with an electrode thereon, and a flexible cable may be directly connected to the electrode on the surface of the actuator by solder bonding.

In such a configuration, the bonding between the electrode and the actuator is likely to be broken, and thus the electrical connection is likely to be opened, because the strength of the bond between the actuator and the flexible cable tends to be low.

DETAILED DESCRIPTION

According to an embodiment, a liquid dispensing head includes a substrate having a first surface and a piezoelectric member on the first surface of the substrate. A sidewall surface portion of the piezoelectric member is inclined at an obtuse angle with respect to the first surface. A vibration plate is positioned above the piezoelectric member in a first direction orthogonal to the first surface. An electrode wiring portion is on the sidewall surface portion and connected to an electrode wiring pattern on the first surface.

Figure 1:
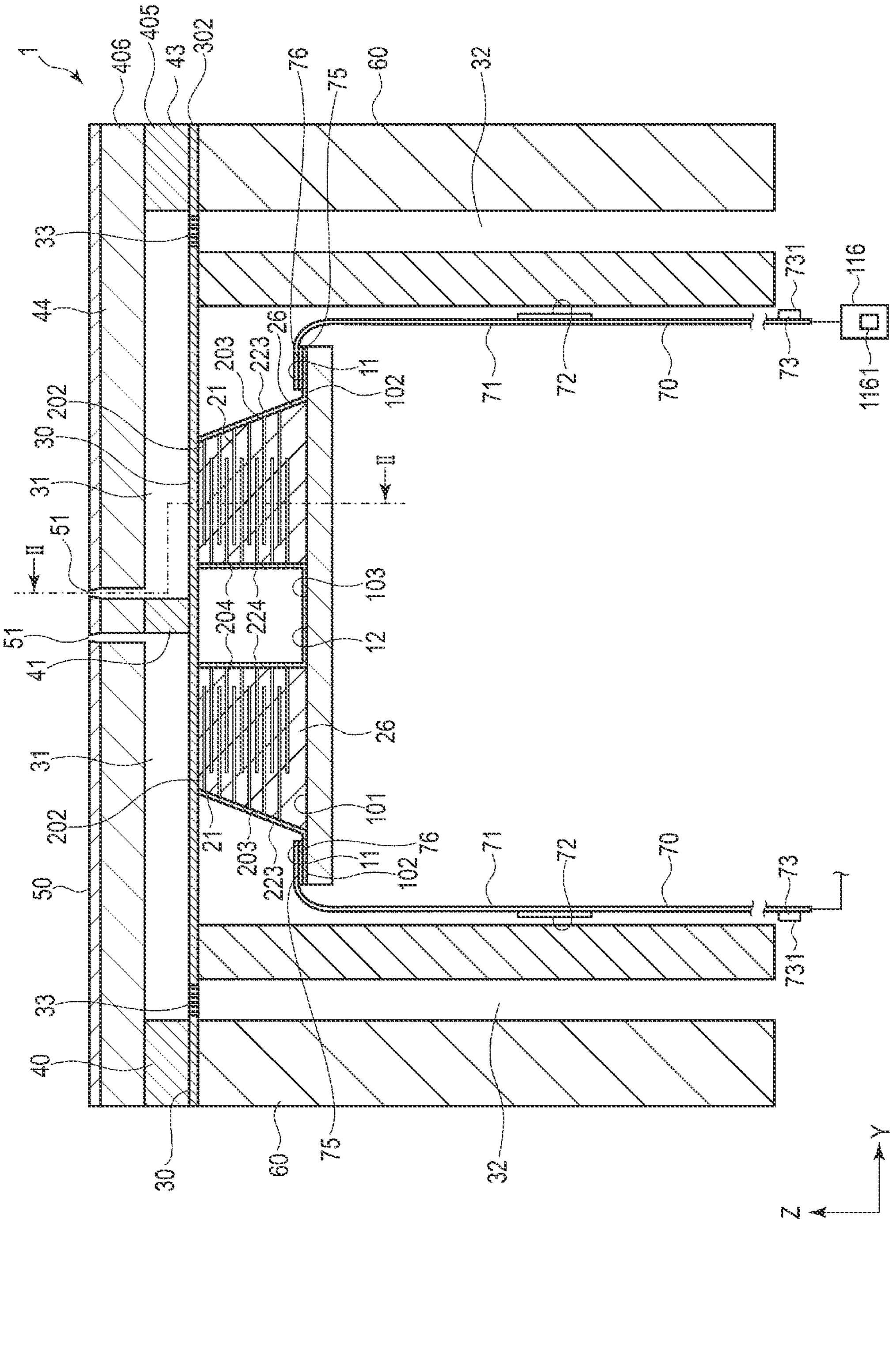
FIG. 1 is a cross-sectional view of an ink jet head according to an embodiment.
Figure 2:
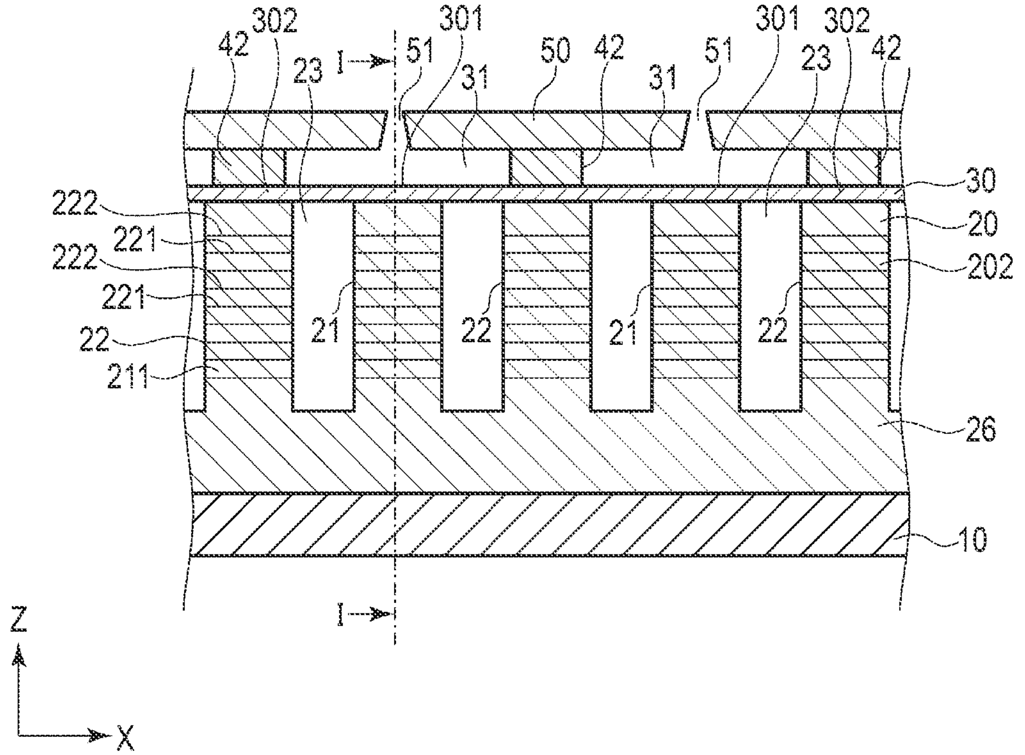
FIG. 2 is another cross-sectional view of an ink jet head according to an embodiment.

Hereinafter, an actuator 20, an ink jet head 1 as a liquid dispensing head, and an ink jet recording device 100 as a liquid dispensing device will be described with reference to FIGS. 1 to 6. FIGS. 1 and 2 are cross-sectional views showing a schematic configuration of an ink jet head 1. FIG. 2 is a cross-sectional view taken along a line II-II of FIG. 1.

Figure 3:
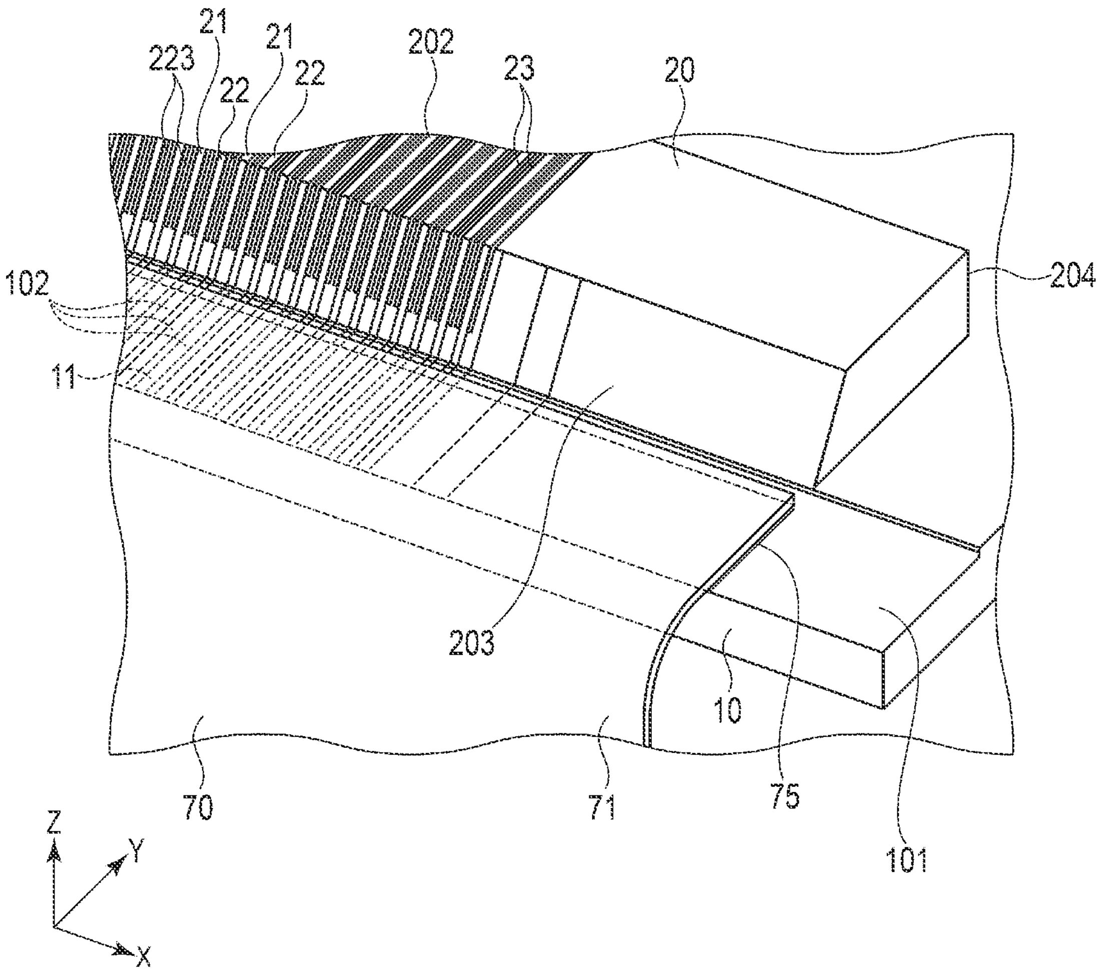
FIG. 3 is a perspective view of an ink jet head according to an embodiment.
Figure 4:
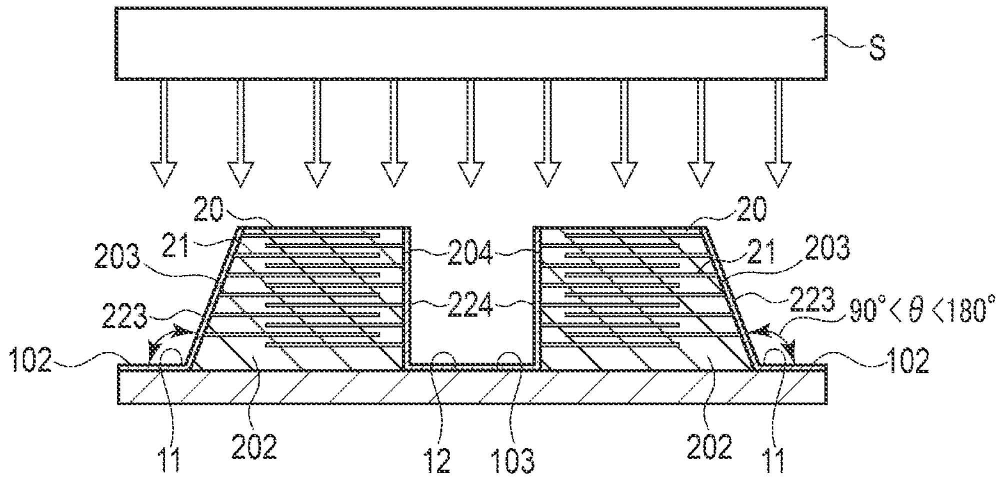
FIG. 4 depicts aspects related to a manufacturing method of an ink jet head according to an embodiment.
Figure 6:
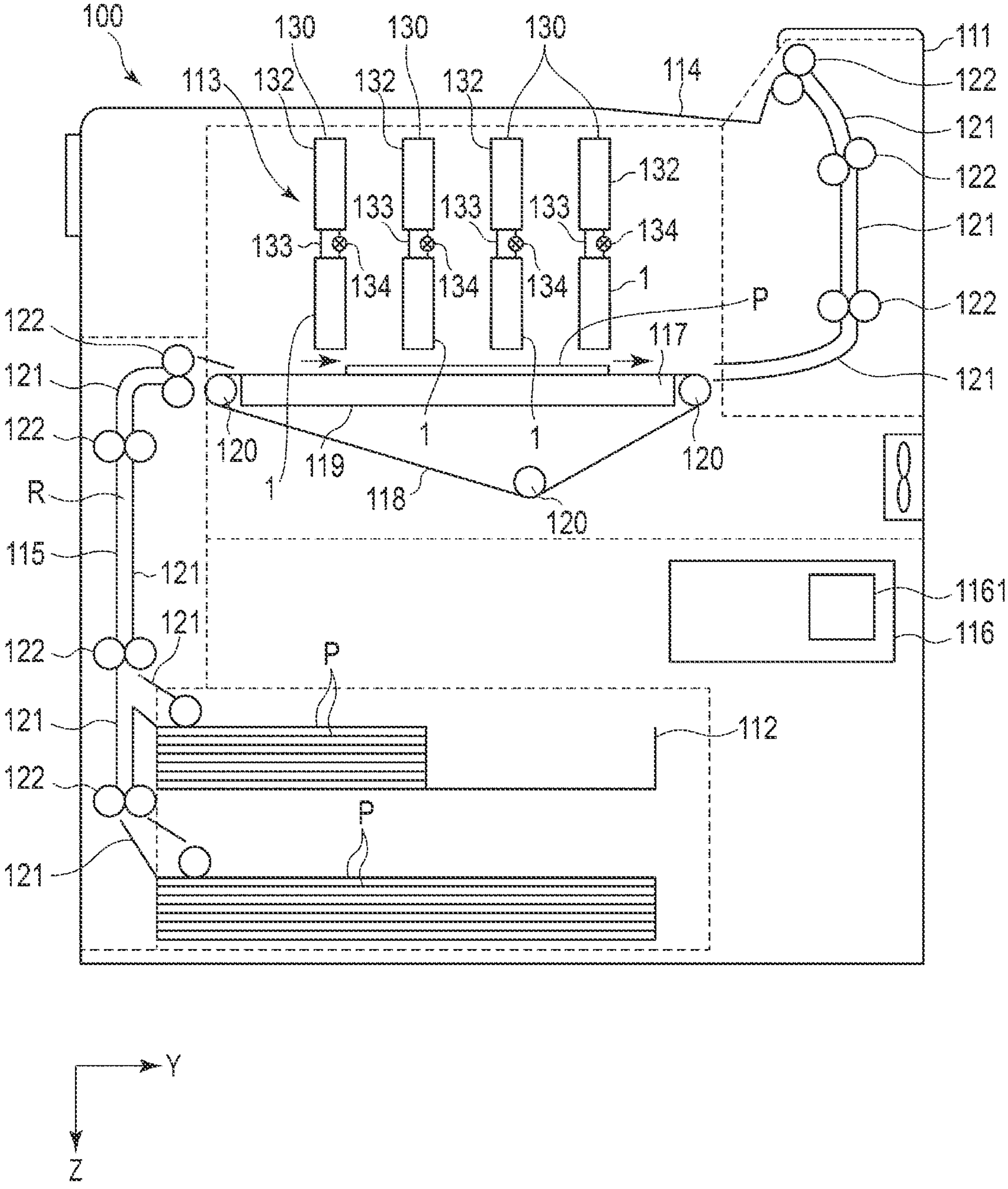
FIG. 6 is a diagram showing a schematic configuration of an ink jet recording device.

FIG. 3 is a perspective view showing a part of the ink jet head 1. FIG. 4 is a diagram showing aspects related to a manufacturing method of an ink jet head 1. FIG. 6 is a diagram showing a schematic configuration of an ink jet recording device 100. Arrows X, Y, and Z in the drawings indicate three directions orthogonal to one another. In the drawings, configurations may be enlarged, reduced, or omitted as appropriate for the sake of description.

As shown in FIGS. 1 and 2, the ink jet head 1 includes a substrate 10, a pair of actuators 20, a flow path portion 40, a nozzle plate 50 (having a plurality of nozzles 51), a frame portion 60, and a driving circuit 70.

In this example, the ink jet head 1 includes two actuators 20 spaced from each other in the Y direction, two nozzle rows in which the plurality of nozzles 51 are arranged along a row direction (X direction), two pressure chamber rows in which a plurality of pressure chambers 31 are arranged along the row direction, and two element rows in which a plurality of piezoelectric elements 21 and 22 are arranged along the row direction. In the present embodiment, an example is shown in which a stacking direction of a plurality of piezoelectric layers 211, a vibration direction of the driving piezoelectric elements 21, and a vibration direction of a vibration plate 30 in the actuator 20 are each along a Z direction.

The substrate 10 is a circuit substrate that supports the pair of actuators 20. The substrate 10 is formed of, for example, alumina in a plate shape. The substrate 10 has a mounting surface 101. Substrate electrode layers 11 and 12 are formed on the mounting surface 101. The mounting surface 101 is also referred to as a wiring surface. For example, on the mounting surface 101, the substrate electrode layer 11 used for forming individual electrodes is formed in an outer region on both outer side portions of the pair of actuators 20, and the substrate electrode layer 12 for forming a common electrode is formed in an inner region between the pair of actuators 20 in the Y direction. The surfaces of the pair of actuators 20 that face each other may be referred to as the inner region surfaces and the space/area between these surfaces may be referred to as inner regions. The surfaces of the pair of actuators 20 that face outward (away from each other) may be referred to as outer region surfaces and the space/area outside or beyond these surfaces or the pair actuators 20 may be referred to as outer regions.

In this example, the substrate electrode layers 11 in the outer regions can each be divided into separate portions (individual wirings 102) spaced from each other in the row direction, and thus a predetermined wiring pattern is formed including individual wirings 102 which are also called substrate wirings. For example, each individual wiring 102 is continuous with or connects to an external electrode 223 (electrode) formed on a side surface portion on an outer side of the surface of the actuator 20, and forms an individual electrode.

For example, the individual wiring 102 extends in the same direction as the external electrode 223 on the side surface portion of the actuator 20 in a region in the vicinity of the actuator 20 on the mounting surface 101 and within a reflected light range within which reflected light may reach during an exposure process, such as a photolithographic or other patterning process involving light.

A mounting portion 76 is provided in the outer region on the mounting surface 101. An flexible printed circuit (FPC) 71 is on the mounted portion 76. FPC 71 can be mounted on the mounting portion 76 via an anisotropic conductive film (ACF) 75.

The individual wiring 102 is a conductive material formed by, for example, a vacuum deposition method or an electroless plating method. The individual wirings 102 can be patterned into a predetermined shape by, for example, a patterning process including photolithography.

On the mounting surface 101 of the substrate 10, the substrate electrode layer 12 is formed in the inner region between the pair of actuators 20. The substrate electrode layer 12 is used to form a common wiring 103 (wiring). The common wiring 103 is continuous with or connects to an external electrode 224 (electrode) formed on an inner side surface of the actuator 20. The common wiring 103 functions as a common electrode.

Each actuator 20 is bonded to the mounting surface 101. In this example, two actuators 20 are arranged side by side in the Y direction.

As shown in FIGS. 1 to 3, an actuator 20 includes a plurality of driving piezoelectric elements 21 and a plurality of non-driving piezoelectric elements 22 alternately arranged along the row direction. A connecting portion 26 on the substrate 10 side integrally connects the lower portions of the piezoelectric elements 21 and 22.

The actuator 20 is a stack structure in which piezoelectric layers 211 are alternatingly stacked with internal electrodes 221 and 222.

In the actuator 20, the plurality of driving piezoelectric elements 21 and the plurality of non-driving piezoelectric elements 22 are arranged at regular intervals with each other along one direction (X direction).

The actuator 20 is divided by grooves 23 formed to a predetermined depth from a top portion side (vibration plate 30 side). In this example, the plurality of driving piezoelectric elements 21 and non-driving piezoelectric elements 22 are arranged along the row direction at the same pitch. The groove 23 is formed over the entire width of the actuator 20 in the Y direction.

The pair of actuators 20 form a trapezoidal shape in which one outer side surface portion 203 angles obliquely toward the substrate 10 side. For example, a width of the actuator 20 in Y direction gradually increases with distance from the top portion side going toward the substrate 10 side. A cross-sectional shape of a cross section of each actuator 20 is also a trapezoidal shape, but each actuator 20 has only one inclined (oblique) surface (outer side surface portion 203). For example, an outer side surface portion 203 of the actuator 20 has an inclined surface having an angle of more than 90° but less than 180° with respect to the mounting surface 101 of the substrate 10.

For each of the piezoelectric members 202, the inner side surface portion 204 has an angle with respect to the mounting surface 101 of the substrate 10 that is less than the angle of the outer side surface portion 203 and the mounting surface 101. For example, the inner side surface portion 204 is at an angle of 90° with respect to the mounting surface 101 of the substrate 10.

In the actuator 20, the driving piezoelectric elements 21 and the non-driving piezoelectric elements 22 are each formed in a rectangular shape such that a lateral (width) direction is along the row direction (X direction) and height direction is in the Z direction.

The driving piezoelectric elements 21 and the non-driving piezoelectric elements 22 extend lengthwise in the Y direction. In YZ cross section, these elements have a trapezoidal shape. The individual electrode portions are formed on an inclined surface on one side surface of these elements, the common electrode portions is formed on the other side surface (substantially vertical surface).

The driving piezoelectric elements 21 are arranged at positions facing one of the pressure chambers 31 formed in the flow path portion 40 in the Z direction. For example, center positions of the driving piezoelectric elements 21 in the row direction and the extending direction and center positions of the pressure chambers 31 in the row direction and the extending direction are aligned in the Z direction.

The non-driving piezoelectric elements 22 are arranged at positions facing one a plurality of partition wall portions 42 formed in the flow path portion 40 in the Z direction. The plurality of driving piezoelectric elements 21 and the plurality of non-driving piezoelectric elements 22 are alternately arranged parallel with the grooves 23 interposed therebetween in the row direction.

The piezoelectric member 202 constituting the actuator 20 can be a stack piezoelectric member formed by stacking and sintering sheets of piezoelectric materials.

The piezoelectric member 202 includes the plurality of stacked piezoelectric layers 211, the internal electrodes 221 and 222 formed on opposite surfaces (upper/lower) of each piezoelectric layers 211, the external electrodes 223 formed on the outer side surface portion 203, and the external electrodes 224 formed on the inner side surface portion 204. An outer region side is the side on which the outer side surface portion 203 is disposed on the piezoelectric member 202. An inner region side is the side on which the inner side surface portion 204 is disposed on the piezoelectric member 202. In this example, the driving piezoelectric elements 21 and the non-driving piezoelectric elements 22 have the same stacked structure.

The piezoelectric layer 211 is formed of a piezoelectric ceramic material such as a lead zirconate titanate (PZT)-based ceramic material or a lead-free potassium sodium niobate (KNN)-based ceramic material. The piezoelectric layer 211 is formed as a thin plate shape. The plurality of piezoelectric layers 211 are stacked along the stacking direction in a layer thickness direction, and are bonded to one another. For example, in the present embodiment, the thickness direction and the stacking direction of the piezoelectric layer 211 correspond to the vibration direction (which is the Z direction as depicted).

The internal electrodes 221 and 222 are conductive films formed of a material such as silver-palladium that can be fired and formed into a predetermined shape. The internal electrodes 221 and 222 are formed on certain regions of the main surfaces of the piezoelectric layers 211. The internal electrodes 221 and 222 are for polarities different from each other. For example, each internal electrode 221 is formed in a region reaching extending from an end (first end) of the piezoelectric layer 211 but not reaching the opposite end (second end) of the piezoelectric layer 211 along the Y direction). Each internal electrode 222 is formed in a region not reaching the first end of the piezoelectric layer 211 but reaching the second end of the piezoelectric layer 211. The internal electrodes 221 and 222 are respectively connected to the external electrodes 223 and 224 on side surfaces of the piezoelectric elements 21 and 22.

The piezoelectric member 202 forming the driving piezoelectric elements 21 and the non-driving piezoelectric elements 22 may further include a dummy layer, which is not deformed by an electric field, on either one of or both the substrate 10 side and the nozzle plate 50 side. The dummy layer can be made of the same material as the piezoelectric layer 211, does not function as a piezoelectric body, and serves as a base during fixation (mounting) or serves as polishing margin in order to achieve accuracy during assembly or after assembly.

The external electrodes 223 and 224 are formed on the surfaces of the plurality of driving piezoelectric elements 21 and the plurality of non-driving piezoelectric elements 22, and are connected to the end portions of the internal electrodes 221 and 222.

For example, the external electrode 223 is formed on the inclined surface of the outer side surface portion 203 of the piezoelectric member 202 in the extending direction. The external electrode 223 is divided for each individual element and constitutes an individual wiring. Each external electrode 223 is continuous with the individual wiring 102 formed from the substrate electrode layer 11 on the substrate 10.

For example, each external electrode 223 extends in the same direction as each individual wiring 102 for at least the near vicinity of the actuator 20.

In the present embodiment, the individual wiring 102 is formed along the mounting surface 101, and extends in the same direction as the external electrode 223. Specifically, for example, in a plan view seen from a Z direction), which would be a light exposure direction in a photolithography process, the individual wiring 102 extends along the same straight line along the Y direction.

The external electrode 224 is formed on the inner side surface portion 204 of the piezoelectric member 202. The external electrode 224 is continuous with the common wiring 103 formed by the substrate electrode layer 12 on the substrate 10.

The external electrodes 223 and 224 can be formed of nickel (Ni), chromium (Cr), gold (Au), or the like by a method such as a plating method or a sputtering method. The external electrode 223 and the external electrode 224 are for different polarities from each other.

In an embodiment, the external electrode 223 is an individual electrode for each piezoelectric element 21, and the external electrode 224 is a common electrode. The individual external electrodes 223 of the plurality of driving piezoelectric elements 21 and the plurality of non-driving piezoelectric elements 22 are disposed independently of each other for each of the piezoelectric elements 21. The individual external electrodes 223 are formed by dividing an electrode layer formed on one side surface of the piezoelectric member 202 in the manufacturing process.

The external electrodes 223 are separated from each other by the grooves 23, and are connected to the driving circuit 70 via, for example, the individual wirings 102 on the substrate 10 and the FPC 71 which is a flexible wiring substrate. For example, each of the external electrodes 223 is connected to a control unit 116 via a drive IC 72 of the driving circuit 70 by the FPC 71 connected by ACF mounting using the ACF 75. The external electrodes 223 are driven (e.g., has a voltage applied thereto) under control of a control circuit 1161. In some examples, the external electrode 224 may be routed on the side surface as the external electrode 223 and also connected to the driving circuit 70 via the FPC 71.

For the external electrode 224, the electrode portions are continuous (connected) in a region at or near a bottom portion of the groove 23 to form a common electrode (electrically connected electrode). The external electrodes 224 can be connected to each other on the other side surface of the piezoelectric member 202 from the external electrodes 224 and are connected to the common wiring 103 on the substrate 10. The external electrodes 224 are grounded, for example.

The vibration direction of each of the piezoelectric elements 21 and 22 is along the stacking direction when an electric field is applied. The piezoelectric element 21 is displaced in a d33 direction when voltage is applied.

For example, each of the piezoelectric elements 21 and 22 has between three 50 layers, each layer between 10 μm and 40 μm in thickness. The total thickness of these stacked layers is less than 1000 μm.

The driving piezoelectric element 21 vibrates when a voltage is applied to the internal electrodes 221 and 222 via the external electrodes 223 and 224. In the present embodiment, the driving piezoelectric element 21 performs a longitudinal vibration along the stacking direction of the piezoelectric layers 211. The longitudinal vibration here is, for example, “vibration in a thickness direction defined by a piezoelectric constant d33”. The driving piezoelectric element 21 displaces the vibration plate 30 by the longitudinal vibration, and, in this manner, deforms the pressure chamber 31.

The flow path portion 40 includes the vibration plate 30 disposed to face one side of an actuator 20 in a deformation direction, and a plurality of flow path substrates 405 and 406 stacked on one side of the vibration plate 30.

The vibration plate 30 is provided between the flow path substrate 405 and the actuator 20 in the vibration direction. The vibration plate 30 and the flow path substrate 405 form the flow path portion 40.

The vibration plate 30 extends along a plane orthogonal to the Z direction which is the vibration direction. The vibration plate 30 is bonded to upper side of the plurality of piezoelectric elements 21 and 22, that is, a surface on the nozzle plate 50 side. The vibration plate 30 is, for example, deformable. The vibration plate 30 is bonded to the driving piezoelectric elements 21 and the non-driving piezoelectric elements 22 of the actuator 20 and the frame portion 60. For example, the vibration plate 30 includes a vibration region 301 facing the piezoelectric elements 21 and 22 and a support region 302 facing the frame portion 60.

The vibration region 301 has, for example, a flat plate shape, and is disposed such that the thickness direction is the vibration direction of the piezoelectric layer 211. The vibration plate 30 is, for example, a metal plate. The vibration plate 30 can have a plurality of vibration portions which face the respective pressure chambers 31 and can be displaced individually. The vibration plate 30 can be formed by integrally connecting the plurality of vibration portions.

For example, the vibration plate 30 is formed of a nickel plate or a stainless steel (SUS) plate, and has a thickness of about 5 μm to 15 μm. In the vibration region 301, a fold or a step may be formed at a portion adjacent to the vibration portion or between the vibration portions otherwise adjacent to each other such that the vibration portions can be more easily displaced. The vibration region 301 is deformed by displacement of the driving piezoelectric element 21 caused by expansion and compression of the corresponding driving piezoelectric element 21 when a voltage is applied or the like. The vibration plate 30 can be formed by electroforming, electroplating, or the like. The vibration plate 30 can be bonded to an upper end surface of the actuator 20 by adhesive, or the like.

The support region 302 is a plate-shaped member disposed between the frame portion 60 and the flow path substrate 405. The support region 302 includes a communication portion 33 having a through hole communicating with (connecting to) a common chamber 32.

For example, the communication portion 33 comprise of a filter member (a filter material) having a large number of pores, as through holes, through which a liquid can pass.

The flow path substrates 405 and 406 are disposed between the nozzle plate 50 and the vibration plate 30. For example, the flow path substrate 405 is bonded to one side of the vibration plate 30. The flow path substrate 406 is bonded to the other side of the flow path substrate 405.

The flow path substrates 405 and 406 form an ink flow path having a plurality of individual flow paths that connect to the plurality of pressure chambers 31 and connect the pressure chambers 31 and the common chambers 32.

For example, the flow path substrate 405 has a partition wall portion 41, partition wall portions 42, and peripheral wall portion 43.

For example, the partition wall portion 41 is a wall member that partitions the rows of the pressure chambers 31 facing the pair of actuators 20.

The partition wall portions 42 are wall members that separate the plurality of pressure chambers 31 arranged on both sides of the pressure chambers 31. The partition wall portions 42 are disposed to face the non-driving piezoelectric elements 22, and are supported by the non-driving piezoelectric elements 22 via the vibration plate 30. A plurality of the partition wall portions 42 are provided at the same pitch as the arrangement pitch of the pressure chambers 31.

The peripheral wall portion 43 is a wall member surrounding an outer peripheral portion of the ink flow path including the plurality of individual flow paths and a common flow path.

The flow path substrate 406 has a frame portion 44 that forms a flow path from each pressure chamber 31 to the nozzle 51.

In the flow path portion 40, two rows of the pressure chambers 31 arranged in the X direction in each actuator 20 are formed. In each row, the pressure chambers 31 arranged in the X direction are separated by the partition wall portions 42. That is, both sides of the pressure chamber 31 in the parallel direction are constituted by the partition wall portions 42. The row of the pressure chambers 31 disposed to face one actuator 20 and the row of the pressure chambers 31 disposed to face the other actuator 20 are separated by the partition wall portions 41. Each pressure chamber communicates with a nozzle 51 formed in the nozzle plate 50. The pressure chamber 31 is closed (covered) by the vibration plate 30 on an opposite side of the nozzle plate 50. The pressure chambers 31 are voids formed on one side of the vibration region 301 of the vibration plate 30 and communicate with the common chambers 32 via the individual flow paths and the communication portions 33. The pressure chambers 31 also communicate with the nozzles 51 formed in the nozzle plate 50.

The pressure chambers 31 hold the liquid supplied from the common chamber 32, and liquid is dispensed from the nozzles 51 by the vibration of the vibration plate 30.

The nozzle plate 50 is formed as a rectangular plate shape having a thickness of about 10 μm to 100 μm. The nozzle plate 50 can be made of a metal such as stainless steel (SUS) or Ni or of a resin material such as polyimide. The nozzle plate 50 is disposed on one side of the flow path substrate 405 so as to cover the pressure chamber 31 on one side.

The plurality of nozzles 51 are arranged side by side along the X direction to match the pressure chambers 31 and form a nozzle row. For example, two rows of the nozzles 51 are provided, and the nozzles 51 are provided at positions corresponding to each of the plurality of pressure chambers 31 also arranged in two rows. In the present embodiment, the nozzles 51 are provided at positions near an end portion of each pressure chamber 31.

The frame portion 60 is bonded to the vibration plate 30 together with the piezoelectric elements 21 and 22. The frame portion 60 is provided on the side of the piezoelectric elements 21 and 22 and the vibration plate 30 opposite to the flow path substrate 405, and for example, the frame portion 60 is disposed adjacent to the actuator 20 as in the present embodiment. The frame portion 60 is structural and is bonded to the vibration plate 30. The frame portion 60 is provided between the vibration plate 30 and the substrate 10 and forms an outer shell portion of the ink jet head 1. The frame portion 60 forms a flow path for the liquid. In the present embodiment, the frame portion 60 forms the common chamber 32.

The common chamber 32 is formed within the region surrounded by the frame portion 60 and communicates with the pressure chamber 31 through the communication portion 33 provided in the vibration plate 30 and the individual flow path. The driving circuit 70 includes the flexible printed circuits (FPC) 71 connected to an actuator 20 via the individual wiring 102 and the common wiring 103, the drive IC 72 mounted on the FPC 71, and a printed wiring substrate 73 mounted on the other end of the FPC 71.

The driving circuit 70 drives a piezoelectric element 21 by applying a drive voltage from the drive IC 72 to the external electrodes 223 and 224, which increases or decreases a volume of the pressure chamber 31, and causes droplets to be dispensed from the corresponding nozzle 51.

The FPC 71 is connected to the mounting surface 101 of the substrate 10 and the plurality of external electrodes 223 and 224 via the individual wiring 102 and the common wiring 103. A chip on film (COF) on which the drive IC 72 is used as the FPC 71.

The drive IC 72 is connected to the external electrodes 223 and 224 via the FPC 71. The drive IC 72 is an electronic component used for liquid dispensing control.

The drive IC 72 generates a control signal and a driving signal for operating each driving piezoelectric element 21. The drive IC 72 generates the control signal for controlling a timing of dispensing ink and selecting the driving piezoelectric element 21 to dispense the ink in accordance with an image signal or the like received from the control unit 116 of the ink jet recording device 100 in which the ink jet head 1 is mounted. The drive IC 72 generates a voltage to be applied to the piezoelectric element 21 (a driving signal) in accordance with a control signal from the control unit 116. When the driving signal is applied to the piezoelectric element 21, the piezoelectric element 21 is driven to displace the vibration plate 30 and change the volume of the pressure chamber 31. Accordingly, the ink in the pressure chamber 31 experiences a pressure vibration. The pressure vibration causes the ink to be dispensed (ejected) from the nozzle 51 corresponding with the pressure chamber 31. The ink jet head 1 may implement a gradation expression (gray scale output) by changing the number or volume of ink droplets that land for one pixel. The ink jet head 1 may change the number of ink droplets for each pixel by changing the number of times ink is ejected. The drive IC 72 is an example of an application unit that applies the driving signal to the piezoelectric elements 21.

For example, the drive IC 72 includes a data buffer, a decoder, and a driver. The data buffer stores print data in time series (sequence) for each piezoelectric element 21. The decoder controls the driver based on the print data stored in the data buffer for each piezoelectric element 21. The driver outputs the driving signal for operating each piezoelectric element 21 based on the control or output of the decoder. The driving signal is, for example, a voltage to be applied to each piezoelectric element 21.

The printed wiring substrate 73 can be a printing wiring assembly (PWA) on which various electronic components and connectors are mounted. The printed wiring substrate 73 includes a head control circuit 731. The printed wiring substrate 73 is connected to the control unit 116.

In the ink jet head 1, the nozzle plate 50, the frame portion 60, and the flow path portion 40 together form an ink flow path including thereon the plurality of pressure chambers 31 and the common chambers 32. For example, the common chamber 32 connects to an ink cartridge or the like, and the ink is supplied to each pressure chamber 31 through the common chamber 32. A voltage can be applied to each of the piezoelectric elements 21 by wiring. In the ink jet head 1, under the control of the control unit 116 of the ink jet recording device 100, the drive IC 72 applies the drive voltage across the electrodes 221 and 222, so that the piezoelectric element 21 to be driven vibrates in the thickness direction of each piezoelectric layer 211. That is, the piezoelectric element 21 performs the longitudinal vibration.

Specifically, the control unit 116 applies a drive voltage across the internal electrodes 221 and 222 of a piezoelectric element 21 to be driven, and selectively drives each piezoelectric element 21 as appropriate according to print data of the like. Then, by combining deformation in a tensile direction and deformation in a compression direction caused by the driving of the piezoelectric element 21, the vibration plate 30 is deformed, and the volume of the pressure chamber 31 is changed, so that the liquid is drawn in from the common chamber 32 and is dispensed from the nozzle 51.

An example of a manufacturing method of the ink jet head 1 according to an embodiment will be described with reference to FIG. 4. First, the internal electrodes 221 and 222 are formed on each piezoelectric layer 211 by a printing process (e.g., lithography process). Then, the piezoelectric layers 211 on which the internal electrodes 221 and 222 have been formed are stacked together, and a firing process and a polarization process are performed to form the piezoelectric member 202 in its initial state.

Then, the polarization process is performed on the piezoelectric elements 21 of the piezoelectric member 202 on which the internal electrodes 221 and 222 have been formed. The piezoelectric member 202 is attached to the mounting surface 101 of the substrate 10 with an adhesive or the like.

Then, with the piezoelectric member 202 disposed on the substrate 10 in this manner, the surfaces of the substrate 10 and the piezoelectric member 202 are processed to form a continuous surface without a step change (abrupt discontinuity) is formed going from a side surface of the piezoelectric member 202 to the mounting surface 101 of the substrate 10 by a machining process such as grinding using a grindstone. If any burrs or the like are formed when the grindstone is used, a surface treatment such as buff polishing or sand blasting may be additionally performed as finishing.

Subsequently, a metal film is formed by plating on the top surface of the piezoelectric member 202, the outer side surface portion 203, and inner side surface position 204 and on the mounting surface 101 of the substrate 10. For example, by forming the metal film by nickel (Ni) electroless plating or the like, electrode layers serving as the external electrodes 223 and 224 can be formed, and the substrate electrode layers 11 and 12 are also formed on the mounting surface 101 of the substrate 10. A polishing process is then performed on the top surface portion of the piezoelectric member 202 to remove the metal film formed on the top surface portion, and a bonding surface is formed on the top surface portion. By the polishing process, the flatness of the top surface portion of the piezoelectric member 202 to which the vibration plate 30 is to be bonded in the subsequent process is provided appropriately.

Subsequently, a tool such as a diamond cutter is used to perform dicing/cutting, and thus the plurality of grooves 23 can be formed in the actuator 20. For example, the initial undivided piezoelectric member 202 that was bonded to the substrate 10 can be divided into portions by cutting the grooves 23 to a predetermined depth in the piezoelectric member 202. As described above, the driving piezoelectric elements 21 and the non-driving piezoelectric elements 22, which are separated from each other by the grooves 23 at a predetermined pitch, are formed.

Then, the electrode layers on the surfaces of the piezoelectric member 202 and the substrate 10 are patterned by a photolithography process, a photo engraving process (PEP), or the like to form a wiring pattern. In the patterning process by photolithography, after a photosensitive resist material is applied, an exposure process is performed with ultraviolet rays from an irradiation source S (irradiation head) as shown in FIG. 4. Such selective irradiation from irradiation source S may be made using a photomask in or with the irradiation source S. The wiring layer after selective exposure is patterned through a development process and an etching process.

In this context, a PEP method is a process of sequentially performing film formation, resist coating, exposure, development, etching, and then peeling (removing) remaining resist. A metal film can be formed on a substrate using a known method such as plating or sputtering. Then, a resist is applied onto the metal film. Next, the resist is exposed to light through a mask so that the resist remains in those portions to be left as the pattern corresponding to the electrodes. The unnecessary resist portion is dissolved by a developer. Exposed portions of the metal film are then removed by etching. When the remaining resist is removed by a peeling solution, an electrode pattern is left formed on the substrate.

That is, from the wiring layer initially entirely covering the surfaces of the piezoelectric member 202 and the substrate 10, a region for the individual electrodes, that is, the region on the outer sides of the pair of actuators 20 is exposed in a predetermined pattern to remove a predetermined portion, and a patterning process of dividing the substrate electrode layer 11 on one end side for the individual wiring 102 into a plurality of separated portions is performed. At this time, since the outer side surface portion 203 on the individual wiring 102 side has a tapered shape inclined with respect to the mounting surface 101, the mounting surface 101 and the outer side surface portion 203 (forming a continuous surface with the mounting surface 101) can be simultaneously irradiated with light and simultaneously patterned together. That is, the substrate electrode layer 11 formed on the outer side surface portion 203 of the piezoelectric member 202 and the mounting surface 101 is divided to form the external electrodes 223 and the individual wirings 102 in the same process.

For the external electrode 223, a portion of the piezoelectric member 202 on the nozzle plate 50 side is separated by the grooves 23, and a portion on the substrate 10 side is separated by the patterning.

On the other hand, the substrate electrode layer 12 is not divided by the patterning and forms the common wiring 103 in a continuous state. As described above, a plurality of individual wirings 102 divided for each element are on one side of the piezoelectric member 202 and the continuous common wiring 103 is on the other side.

The FPC 71 on which electronic components such as the drive IC 72 are mounted as control components is connected, by the anisotropic conductive film (ACF) 75 to the now formed wiring patterns such as the individual wirings 102 and the common wiring 103 formed. Further, the printed wiring substrate 73 having the head control circuit 731 is connected to the FPC 71. As described above, the mounting portion 76 using the ACF 75 is formed on the substrate 10.

Further, the vibration plate 30, the flow path substrates 405 and 406, and the nozzle plate 50 are stacked on the actuator 20 via a bonding material to permit positioning, the frame portion 60 is disposed on an outer periphery of the actuator 20, and of the different members are bonded to each other, and thus the ink jet head 1 is assembled.

Hereinafter, an example of the ink jet recording device 100 including the ink jet head 1 will be described with reference to FIG. 6. The ink jet recording device 100 includes a housing 111, a medium supply unit 112, an image forming unit 113, a medium discharge unit 114, a conveyance device 115, and the control unit 116.

The ink jet recording device 100 is a liquid dispensing device that performs an image forming process on a sheet P by dispensing a liquid such as the ink the sheet P serving as a printing medium that is a dispensing target is conveyed along a predetermined conveyance path R from the medium supply unit 112 to the medium discharge unit 114 through the image forming unit 113.

The housing 111 forms an outer shell of the ink jet recording device 100. A discharge port through which the sheet P is discharged to the outside is provided in the housing 111.

The medium supply unit 112 includes a plurality of paper feeding cassettes, and can hold a plurality of stacked sheets P having various sizes.

The medium discharge unit 114 includes a sheet discharge tray that can hold the sheet P discharged from the discharge port.

The image forming unit 113 includes a support unit 117 that supports the sheet P and a plurality of head units 130 that are disposed above the support unit 117.

The support unit 117 includes a conveyance belt 118 provided in a loop shape in a predetermined region in which an image is to be formed, a support plate 119 that supports the conveyance belt 118 from a back side, and a plurality of belt rollers 120 provided on the back side of the conveyance belt 118.

The support unit 117 supports the sheet P on a holding surface which is an upper surface of the conveyance belt 118 during the image formation, and conveys the sheet P to a downstream side by feeding the conveyance belt 118 at a predetermined timing due to rotation of the belt rollers 120.

The head unit 130 includes a plurality of (four colors) ink jet heads 1, ink tanks 132, as liquid tanks or liquid supply sources, respectively mounted on the ink jet heads 1, connection flow paths 133 connecting the ink jet heads 1 and the ink tanks 132, and supply pumps 134.

The embodiment includes the ink jet heads 1 of four colors of cyan, magenta, yellow, and black, and the ink tanks 132 that respectively store inks of the respective colors. The ink tank 132 is connected to the ink jet head 1 via the connection flow path 133.

A negative pressure control device such as a pump or the like is connected to the ink tank 132. A negative pressure in the ink tank 132 is controlled by the negative pressure control device in accordance with water head values of the ink jet head 1 and the ink tank 132, so that the ink supplied to each nozzle 51 of the ink jet head 1 is formed into a meniscus having a predetermined shape.

The supply pump 134 is, for example, a liquid feed pump implemented by a piezoelectric pump. The supply pump 134 is provided in a supply flow path. The supply pump 134 is connected to the control circuit 1161 of the control unit 116 through a wiring and can be controlled by the control unit 116. The supply pump 134 supplies a liquid to the ink jet head 1.

The conveyance device 115 conveys the sheet P along the conveyance path R from the medium supply unit 112 to the medium discharge unit 114 through the image forming unit 113. The conveyance device 115 includes a plurality of guide plate pairs 121 disposed along the conveyance path R, and a plurality of conveyance rollers 122.

Each of the plurality of guide plate pairs 121 includes a pair of plate members disposed to face each other with the sheet P to be conveyed sandwiched therebetween, and guides the sheet P along the conveyance path R.

The conveyance roller 122 is driven and rotated under the control of the control unit 116 to convey the sheet P to the downstream side along the conveyance path R. Sensors for detecting a state of sheet conveyance are disposed at various locations on the conveyance path R.

The control unit 116 includes a control circuit 1161 such as a central processing unit (CPU) as a controller or the like, a read only memory (ROM) that stores various programs or the like, a random access memory (RAM) that temporarily stores various variable data, image data, or the like, and an interface unit that inputs data from the outside and outputs data to the outside.

In the ink jet recording device 100, when the control unit 116 receives a print instruction from a user operating an operation input unit on the interface, the control unit 116 drives the conveyance device 115 to convey the sheet P and outputs a print signal to the head unit 130 at a predetermined timing to drive the ink jet head 1. The ink jet head 1 performs a dispensing operation of transmitting a driving signal to the drive IC 72 according to an image signal corresponding to image data, applying the drive voltage to the internal electrodes 221 and 222 to selectively drive the piezoelectric elements 21 as a dispensing target for forming an image on the sheet P held on the conveyance belt 118. In the liquid dispensing operation, the control unit 116 drives the supply pump 134 to supply the ink from the ink tank 132 to the common chamber 32 of the ink jet head 1.

Here, a driving operation for driving the ink jet head 1 will be described. The ink jet head 1 according to the embodiment includes the driving piezoelectric elements 21 disposed to face the pressure chamber 31, and the piezoelectric elements 21 are connected by the wiring so that a voltage can be applied thereto. The control unit 116 transmits the driving signal to the drive IC 72 according to an image signal corresponding to the image data, and applies the drive voltage to the internal electrodes 221 and 222 of the driving piezoelectric element 21 as the driving target, thereby selectively deforming a piezoelectric element 21 as the driving target. By combining deformation in the tensile direction and deformation in the compression direction, the volume of the pressure chamber 31 is changed, so that the liquid is dispensed.

For example, the control unit 116 alternately performs a pulling operation and a compressing (pushing) operation. In the ink jet head 1, during the pulling operation to increase an internal volume of the target pressure chamber 31, the piezoelectric element 21 contracts but the piezoelectric element 21 which is not the driving target is not deformed. During the compressing operation to reduce the internal volume of the target pressure chamber 311, the target piezoelectric element 21 is expanded. The non-driven piezoelectric element 22 is not deformed.

According to the ink jet head 1 and the ink jet recording device 100 according to an embodiment, since the side surface portion on one side of the actuator 20 has a trapezoidal shape having an inclined surface, processability of the patterning process by light irradiation such as exposure can be improved. By making the outer side surface portion 203 of the actuator 20 continuous to the mounting surface 101, the electrode can be more easily led out, and mountability can be further improved. For example, when collimated, single-direction light is used in a photolithographic patterning process or the like, and the electrode wiring on the side surface portion of the actuator and the wiring portion of the mounting surface 101 are orthogonal (90 degree) to each other, the wiring pattern cannot be formed on the side surface portion in the same exposure process. However, the mounting surface 101 and the outer side surface portion 203 as arranged in the present embodiment can be patterned at the same time by making the angle with respect to the side surface portion an obtuse angle (greater than 90° but less than 180°).

By mounting a component on the mounting surface 101 using the ACF 75, a failure due to solder bonding can be avoided. That is, when the solder bonding is used, since an adhesion strength between the piezoelectric member and the electrode or an adhesion strength of the solder bonding is low, when stress is applied to the flexible cable, the solder bonding portion may be easily broken. However, by adopting ACF-type mounting, the adhesion strength can be improved and breakage can be prevented.

Compared to solder mounting in which the piezoelectric body is heated with the flexible cable interposed therebetween, the load due to pressing and heating can be reduced. In the case of the solder mounting, if the pressure (pressing) is not enough, there is a possibility that an open fault or the like may occur due to a bonding failure, but a bonding property can be improved by ACF mounting. Further, for example, when the solder bonding is applied to the surface of a piezoelectric member, the bonding surface will be constrained by the solder, and the piezoelectric member in this area may be difficult to be deformed. However, by using ACF mounting, the constraining effect of the solder can be avoided and deformation characteristics can be improved. When the solder bonding is applied to the surface of a piezoelectric member, the portion (mounting portion) in contact with or adjacent to the solder bonding may sometimes be broken due to the deformation of the piezoelectric member. However, the mounting portion is less likely to be broken c by using ACF mounting.

For example, in the case of a shear mode structure, since patterning of the electrode wirings on both sides (one surface and the opposite surface) of the piezoelectric member is required, inclination on the both sides is required. However, in the actuator 20 according to the present embodiment, since one side is a common electrode and patterning is not required, inclination on the common electrode side is not required. That is, since only one side surface of the actuator 20 needs to be inclined, a width of the ink jet head 1 can be reduced and the overall head size can be reduced.

The present disclosure is not limited to the particular embodiments described above, and constituent elements can be modified and embodied in an implementation stage without departing from the gist thereof.

Specific materials and configurations of the piezoelectric elements 21 and 22 are not limited to those described above, and may be appropriately changed, modified, or varied.

For example, laser patterning (laser writer) can be used to form the wiring pattern. In this case, since the surface and the inclined surface also can be simultaneously irradiated with laser light in such a process, the same effects as in the above embodiment can be obtained.

The specific shape of the wiring is not limited to the above. For example, the wiring portion on the mounting surface 101 may be a mirrored or symmetric angle with respect to the wiring portion on the outer side surface portion 203. Alternatively, the extending directions of the different wiring portions may be different from one another in any or various manners.

Figure 5:
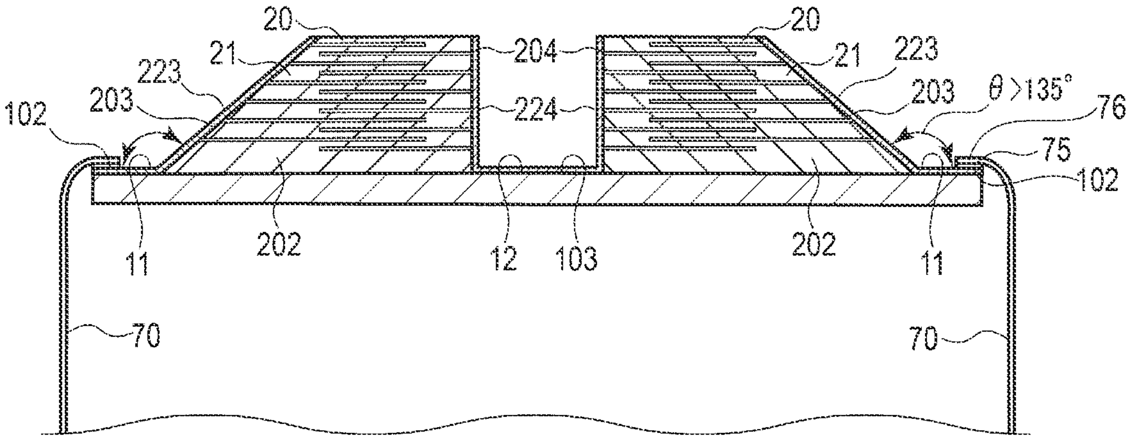
FIG. 5 depicts aspects of an ink jet head according to another embodiment.

In an example, if directions of the corresponding wiring patterns are not aligned near the piezoelectric member 202, the influence of the reflected light at the meeting of the outer side surface portion 203 and the mounting surface 101 during exposure for patterning can be eliminated by adjusting the angle of the inclined surface. In this case, it is desirable that an angle at which the outer side surface portion 203 intersects the mounting surface 101 is greater than 135°. That is, as shown in FIG. 5 as another embodiment, by setting the inclination angle θ to an angle larger than 135°, a configuration in which restriction on the extending directions of each separate wiring of the wiring pattern is small and additional degrees of freedom for the wiring design can be obtained.

The pattern of the individual wirings 102 may be formed simultaneously with the patterning of the external electrode 223 having an inclined surface, or may be formed in a separate process.

In an embodiment, the plurality of piezoelectric layers 211 are stacked, and the driving piezoelectric element 21 is driven using the longitudinal vibration (d33) in the stacking direction, but the disclosure is not limited thereto. For example, in an embodiment, each piezoelectric element 21 can be constituted by a single layer of a piezoelectric material. An embodiment may include a piezoelectric element 21 which is driven by lateral vibration in a d31 direction.

The arrangement of the nozzles 51 and the pressure chambers 31 is not limited. For example, two or more rows of the nozzles 51 may be arranged. Air chambers serving as dummy chambers may be formed between or among the pressure chambers 31. The ink jet head is not limited to a circulation type, and may be a non-circulation type ink jet head.

In addition, the configurations and positional relationships of the various components including the flow path portion 40, the nozzle plate 50, and the frame portion 60 are not limited, and may be appropriately changed.

In an embodiment, two actuators 20 are arranged in parallel on the substrate 10. The embodiments are not limited thereto, and the number of actuators 20 may be one, or three or more.

The liquid to be dispensed is not limited to ink for printing. An embodiment may be a device that dispenses a liquid containing conductive particles for forming a wiring pattern of a printed wiring substrate.

In an embodiment, the ink jet head 1 is used in a liquid dispensing device such as the ink jet recording device, but the disclosure is not limited thereto. The ink jet head 1 can be used for, for example, in a variety of different devices such as 3D printers, industrial manufacturing machines, and medical research applications, to provide a reduced size, weight, and cost for such devices.

While certain embodiments have been described, these embodiments have been presented as examples, and are not intended to limit the scope of the disclosure. These novel embodiments can be implemented in various other forms, and various omissions, substitutions, and changes can be made without departing from the spirit of the embodiments. The embodiments and the modifications thereof are included in the scope and the spirit of the disclosure and are also included in the embodiments described within the scope of claims and an equivalent scope thereof.

What is claimed is:

1. A liquid dispensing head, comprising:

a substrate having a first surface;

a piezoelectric member on the first surface of the substrate, a sidewall surface portion of the piezoelectric member being inclined at an obtuse angle with respect to the first surface;

a vibration plate above the piezoelectric member in a first direction orthogonal to the first surface; and an electrode wiring portion on the sidewall surface portion and connected to an electrode wiring pattern on the first surface.

2. The liquid dispensing head according to claim 1, further comprising:

a pressure chamber above the vibration plate in the first direction; and a substrate wiring portion in the electrode wiring pattern on the first surface, the substrate wiring portion being connected to the electrode wiring portion at a position where the sidewall surface portion meets the first surface.

3. The liquid dispensing head according to claim 2, wherein the obtuse angle is greater than 135°.

4. The liquid dispensing head according to claim 3, wherein an opposite sidewall surface portion of the piezoelectric member is inclined at less than 135° with respect to the first surface.

5. The liquid dispensing head according to claim 4, the opposite sidewall surface portion is inclined at approximately 90° with respect to the first surface.

6. The liquid dispensing head according to claim 2, further comprising:

an anisotropic conductive film on the first surface, the anisotropic conductive film connecting the substrate wiring portion to a flexible wiring substrate.

7. The liquid dispensing head according to claim 6, further comprising:

an electronic component mounted on the flexible wiring substrate, the substrate wiring portion being electrically connected to the electronic component via the flexible wiring substrate.

8. The liquid dispensing head according to claim 1, an opposite sidewall surface portion is inclined at approximately 90° with respect to the first surface.

9. The liquid dispensing head according to claim 1, wherein the piezoelectric member comprises a plurality of layers of piezoelectric material, each layer having a first electrode on a first main surface of the layer and a second electrode on a second main surface of the layer, each of the first electrodes extends to the sidewall surface portion, and each of the second electrodes extends to an opposite sidewall surface portion.

10. The liquid dispensing head according to claim 9, the opposite sidewall surface portion is inclined at approximately 90° with respect to the first surface of the substrate.

11. The liquid dispensing head according to claim 10, further comprising:

a common electrode on the first surface of the substrate, the common electrode electrically connected to each of the second electrodes.

12. The liquid dispensing head according to claim 9, further comprising:

a plurality of grooves extending into the piezoelectric member in the first direction from an upper surface of the piezoelectric member.

13. An inkjet head, comprising:

a substrate having a first surface;

a piezoelectric member on the first surface of the substrate, a sidewall surface portion of the piezoelectric member being inclined at an obtuse angle with respect to the first surface, an opposite sidewall surface portion being at an approximately right angle with respect to the first surface;

a vibration plate above the piezoelectric member in a first direction orthogonal to the first surface;

a nozzle plate above the vibration in the first direction;

a plurality of pressure chambers between the vibration plate and the nozzle plate;

a plurality of grooves extending into the piezoelectric member in the first direction from an upper surface of the piezoelectric member;

a plurality of individual electrode portions on the sidewall surface portion, each individual electrode portion connected to an electrode wiring pattern on the first surface;

a plurality of common electrode portions on the opposite sidewall surface portion, each common electrode portion connected to a common electrode on the first surface;

a plurality of substrate wiring portions in the electrode wiring pattern on the first surface, each substrate wiring portion being connected to a respective individual electrode wiring portion at a position where the sidewall surface portion meets the first surface;

an anisotropic conductive film on the substrate wiring portions;

a flexible wiring substrate connected to the plurality of wiring substrate portions by the anisotropic conductive film; and an electronic component on the flexible wiring substrate, at least one individual electrode portion being electrically connected to the electronic component.

14. The inkjet head according to claim 13, wherein the obtuse angle is greater than 135°.

15. A liquid dispensing device, comprising:

a liquid supply source;

a liquid dispensing head connected to the liquid supply and including:

a substrate having a first surface;

a piezoelectric member on the first surface of the substrate, a sidewall surface portion of the piezoelectric member being inclined at an obtuse angle with respect to the first surface;

a vibration plate above the piezoelectric member in a first direction orthogonal to the first surface; and an electrode wiring portion on the sidewall surface portion and connected to an electrode wiring pattern on the first surface.

16. The liquid dispensing device according to claim 15, the liquid dispensing head further comprising:

a pressure chamber above the vibration plate in the first direction; and a substrate wiring portion in the electrode wiring pattern on the first surface, the substrate wiring portion being connected to the electrode wiring portion at a position where the sidewall surface portion meets the first surface.

17. The liquid dispensing device according to claim 16, wherein the obtuse angle is greater than 135°.

18. The liquid dispensing device according to claim 16, further comprising:

an anisotropic conductive film on the first surface, the anisotropic conductive film connecting the substrate wiring portion to a flexible wiring substrate.

19. The liquid dispensing device according to claim 18, further comprising:

an electronic component mounted on the flexible wiring substrate, the substrate wiring portion being electrically connected to the electronic component via the flexible wiring substrate.

20. The liquid dispensing device according to claim 15, an opposite sidewall surface portion is inclined at approximately 90° with respect to the first surface.

* * * * *